United States Patent

Mannami et al.

[11] Patent Number: 5,871,654
[45] Date of Patent: Feb. 16, 1999

[54] METHOD FOR PRODUCING A GLASS SUBSTRATE FOR A MAGNETIC DISK

[75] Inventors: Kazuo Mannami; Ichiro Hayashi; Atsushi Tokuma, all of Yonezawa, Japan

[73] Assignee: AG Technology Co., Ltd., Yokohama, Japan

[21] Appl. No.: 737,923

[22] PCT Filed: Mar. 29, 1996

[86] PCT No.: PCT/JP96/00843

§ 371 Date: Dec. 2, 1996

§ 102(e) Date: Dec. 2, 1996

[87] PCT Pub. No.: WO96/30901

PCT Pub. Date: Oct. 3, 1996

[30] Foreign Application Priority Data

Mar. 30, 1995 [JP] Japan ..................................... 7-073626

[51] Int. Cl.[6] ....................................................... B44C 1/22
[52] U.S. Cl. ................................ 216/22; 216/88; 216/91; 216/97
[58] Field of Search ................................. 216/22, 38, 52, 216/88, 89, 91, 97; 438/691, 692, 697

[56] References Cited

U.S. PATENT DOCUMENTS

| | | | |
|---|---|---|---|
| 5,131,977 | 7/1992 | Morizane et al. | 216/22 |
| 5,268,071 | 12/1993 | Sono et al. | 216/97 X |
| 5,429,711 | 7/1995 | Watanabe et al. | 216/89 X |

FOREIGN PATENT DOCUMENTS

| | | |
|---|---|---|
| 1-67714 | 3/1989 | Japan . |
| 3-245322 | 10/1991 | Japan . |
| 5-314456 | 11/1993 | Japan . |

*Primary Examiner*—William Powell
*Attorney, Agent, or Firm*—Oblon, Spivak, McClelland, Maier & Neustadt, P.C.

[57] ABSTRACT

To reduce occurrence of flaws in a polishing process by preventing an abrasive grain or metallic particles deposited on the surface of a glass substrate for a magnetic disk in a lapping process from entering into the subsequent polishing process. A lapping process for the main surface is a glass substrate for a magnetic disk is conducted; an etching process for the main surface of the glass substrate is conducted to the extent of a depth of 0.1 μm to 3 μm, followed by conducting a polishing process for the main surface of the glass substrate where the etching process has been conducted.

4 Claims, No Drawings

METHOD FOR PRODUCING A GLASS SUBSTRATE FOR A MAGNETIC DISK

TECHNICAL FIELD

The present invention relates to a method for producing a glass substrate for a magnetic disk to reduce occurrence of flaws in its front surface.

BACKGROUND ART

In conventional methods for producing a glass substrate for a magnetic disk, there has been carried out such a method for processing a glass substrate into a concentric circular form, i.e., a doughnut-like form; conducting a lapping process for polishing it with use of separating abrasive grains on a metallic surface plate; and conducting further a polishing process wherein the surface having been lapped is polished with use of a polishing pad made of synthetic resin and separating abrasive grains having a finer grain size.

Washing was generally conducted between the lapping process and the polishing process, and an etching process for removing foreign substances on the surface of the glass substrate for a disk was not conducted. As a result, abrasive grains having a larger grain size produced during the lapping process and metallic particles resulted from the metallic surface plate for lapping were left in the polishing process which was conducted subsequent to the lapping process, and these caused occurrence of flaws in the surface of the glass substrate for a disk and a damage to the polishing pad.

As an example for the etching process, there has been known a method disclosed in, for instance, Japanese unexamined Patent Publication No. 230621/1995. The main purpose of this method is to reduce the depth of flaws existing in an inner circumferential area of the glass substrate to thereby increase the mechanical strength of the glass substrate. Accordingly, there is a condition that the depth of the glass substrate surface by the etching be deeper than 3 $\mu$m. As another example, there is a case that an etching process is conducted as a texture (minute projections and recesses in a magnetic disk surface) forming technique to improve friction sliding characteristics to the magnetic head.

In this method, however, a polishing process is not used after the etching process. Accordingly, abnormal projections which exceed the height of the texture around the projections are formed at a masked portion in the glass substrate surface for a disk, due to deposition of dust or the like. When a magnetic disk produced by using such glass substrate is rotated at a high speed such as 3000 rpm and a magnetic head is floated above the disk at a height of 350 Å for instance, there was a possible problem of causing head-crushing of the magnetic head or breakage of a portion in the magnetic disk surface. In this case, it is necessary to suppress the depth by the etching to be less than 350 Å for instance. However, such a small amount (depth) of etching was insufficient to remove the abrasive grains and the like, and a liquid phase etching which was usually carried out made it difficult to control the depth by the etching.

DISCLOSURE OF THE INVENTION

It is an object of the present invention to prevent abrasive grains deposited on the surface of a glass substrate for a magnetic disk in a lapping process and metallic particles produced from a metallic surface plate for the lapping process from being brought to a polishing process subsequent to the lapping process whereby occurrence of flaws in the polishing process is reduced.

The present invention is to solve the above-mentioned problem and to provide a method for producing a glass substrate for a magnetic disk which comprises:

conducting a lapping process for the main surface of a glass substrate for a magnetic disk;

conducting an etching process for the main surface of the glass substrate in a depth of 0.1 $\mu$m to 3 $\mu$m, and conducting a polishing process for the main surface of the glass substrate where the etching process has been conducted.

The present invention has been attained by finding that abrasive grains deposited on the main surface and a portion of inner or outer circumferential portion of the glass plate for a disk and fine particles produced from a metallic surface plate in the lapping process can be completely removed by conducting an etching process with use of an etching solution between the lapping process and the polishing process. In this case, when the depth by the etching is more than 3 $\mu$m, the mechanical strength can remarkably be improved. However, when the main purpose is to remove foreign substances on the surface of the glass substrate for a magnetic disk, a depth of about 0.1 $\mu$m to 3 $\mu$m by the etching provides a sufficient effect. Further, according to the present invention, minute projections on the surface of the glass plate for a magnetic disk, which are formed during the etching process, can be removed by conducting the polishing process after the etching process.

The etching solution used for the present invention may be various types of etching solution used for etching a glass surface, such as an aqueous solution of hydrofluoric acid, a $HF-H_2SO_4$ solution, an aqueous solution of $NH_4F$, an aqueous solution of $H_2SiF_6$, or another type of glass etching solution.

The lapping process in the present invention is referred to as a method for polishing by using a metallic surface plate, as described before, and separating abrasive grains dispersed in water or the like. It is simply referred to as lapping. On the other hand, the polishing process conducted after the lapping process is referred to as a method for polishing by using a polishing pad of synthetic resin and separating abrasive grains (which are finer than the abrasive grains for lapping process and of a lower hardness) dispersed in water or the like. It is simply referred to as polishing.

In accordance with the present invention, the abrasive grains and the metallic particles deposited on the glass substrate surface, which could not conventionally be removed by washing, are subjected to the etching process after the lapping process to thereby dissolve them together with a part of the glass substrate surface, whereby foreign substances can easily be removed from the glass substrate surface.

BEST MODE FOR CARRYING OUT THE INVENTION

[EXAMPLES]

[Examples 1 and 2]

Each 100 glass substrates of concentrical circular shape (doughnut-like shape) having an outer diameter of 65 mm and an inner diameter of 20 mm were prepared by using glass plates of aluminoborosilicate glass having a thickness of about 1.1 mm. By using a polishing machine provided with a surface plate made of cast iron, the main surface of these circular glass substrates were lapped by about 400 $\mu$m in terms of a change of plate thickness (an amount of polishing) by supplying separating abrasive grains of an average diameter of 40 μm. In Example 1, a hydrofluoric acid solution having a concentration of 2% was used as an etching solution to conduct an etching process of a depth of 0.1 μm to the glass substrates. Then, washing was conducted by using a brush and a detergent of weak alkali, and pure water was used for ultrasonic cleaning. Then, cerium oxide of an average diameter of about 1 μm was fed to a polishing pad of synthetic resin to conduct polishing of about 60 μm in terms of a change of plate thickness. Then, washing was conducted by using a brush and a detergent of weak alkali, and ultrapure water was used for ultrasonic cleaning. Thus, samples of glass substrate for magnetic disks were prepared.

The glass substrates for magnetic disks thus obtained were put under a light source of 10000 luxes to carry out visual check to find a proportion of glass substrates having flaws by the visual check. As a result, the rate was 5% to the total number.

In Example 2, the samples of glass substrate for magnetic disks were prepared in the same manner as in Example 1 except that the depth by the etching after the lapping process was 2.8 μm. When the visual check was conducted to the glass substrates obtained in Example 2, the rate of flaws by the visual check was 2%.

In Comparative Example 1, the samples of glass substrate for magnetic disks were prepared in the same manner as in Example 1 except that no etching process was conducted after the lapping process. When the visual check was conducted to the glass substrates for magnetic disks obtained in Comparative Example 1, the rate of flaws by the visual check was 15%.

In Comparative Example 2, the samples of glass substrate for magnetic disks were prepared in the same manner as in Example 1 except that the depth by the etching after the lapping process was 600 Å. When the visual check was conducted to the glass substrates for magnetic disks obtained in Comparative Example 2, the rate of flaws by the visual check was 12%.

[Examples 3 and 4]

Each 100 glass substrates of concentrical circular shape (doughnut-like shape) having an outer diameter of 65 mm and an inner diameter of 20 mm were prepared by using glass plates of soda lime silica glass having a thickness of about 1.1 mm. By using a polishing machine provided with a metallic surface plate, the main surface of these circular glass substrates were lapped by about 400 μm in terms of a change of plate thickness (an amount of polishing) by supplying separating abrasive grains of an average diameter of 40 μm. In Example 3, a hydrofluoric acid solution having a concentration of 2% was used as an etching solution to conduct an etching process of a depth of 0.1 μm to the glass substrates. Then, washing was conducted by using a brush and a detergent of weak alkali, and pure water was used for ultrasonic cleaning. Then, cerium oxide of an average diameter of about 1 μm was fed to a polishing pad of synthetic resin to conduct polishing of about 60 μm in terms of a change of plate thickness. Then, washing was conducted by using a brush and a detergent of weak alkali, and ultrapure water was used for ultrasonic cleaning. Thus, samples of glass substrate for magnetic disks were prepared.

The glass substrates for magnetic disks thus obtained in Example 3 were put under a light source of 10000 luxes to carry out visual check to find a proportion of glass substrates having flaws by the visual check. As a result, the rate was 7% to the total number.

In Example 4, the samples of glass substrate for magnetic disks were prepared in the same manner as in Example 3 except that the depth by the etching after the lapping process was 2.5 μm. When the visual check was conducted to the glass substrates obtained in Example 4, the rate of flaws by the visual check was 5%.

In Comparative Example 3, the samples of glass substrate for magnetic disks were prepared in the same manner as in Example 3 except that no etching process was conducted after the lapping process. When the visual check was conducted to the glass substrates for magnetic disks obtained in Comparative Example 3, the rate of flaws by the visual check was 20%.

In Comparative Example 4, the samples of glass substrate for magnetic disks were prepared in the same manner as in Example 3 except that the depth by the etching after the lapping process was 500 Å. When the visual check was conducted to the glass substrates for magnetic disks obtained in Comparative Example 4, the rate of flaws by the visual check was 18%.

INDUSTRIAL APPLICABILITY

According to the present invention, abrasive grains deposited on the surface of a glass substrate for a magnetic disk and metallic particles produced from a metallic surface plate for polishing, which could not be removed by a conventional washing process, are dissolved together with a part of the surface of the glass substrate by conducting an etching process after the lapping process, whereby foreign substances on the surface of the glass substrate for a magnetic disk can easily be removed. Accordingly, the abrasive grains deposited on the surface of the glass substrate for a magnetic disk and the metallic particles for lapping process can be prevented from being brought to the subsequent polishing process, and a possibility of occurrence of flaws in the surface of the glass substrate for a magnetic disk after polishing can be reduced.

We claim:

1. A method for producing a glass substrate for a magnetic disk which comprises:

conducting a lapping process for the main surface of a glass substrate for a magnetic disk;

conducting an etching process for the main surface of the glass substrate in a depth of 0.1 μm to 3 μm, and conducting a polishing process for the main surface of the glass substrate where the etching process has been conducted.

2. The method for producing a glass substrate for a magnetic disk according to claim 1, wherein an etching solution including hydrofluoric acid as the main component is used to conduct the etching process for the main surface of the glass substrate for a magnetic disk.

3. A method for producing a glass substrate for a magnetic disk which comprises:

conducting a lapping process for a main surface of a glass substrate for a magnetic disk, wherein the glass substrate has a concentrical circular shape with a centrally located hole, such that the substrate has an outer diameter and an inner diameter;

conducting an etching process for the main surface of the glass substrate in a depth of 0.1 μm to 3 μm, and conducting a polishing process for the main surface of the glass substrate where the etching process has been conducted.

4. The method for producing a glass substrate for a magnetic disk according to claim 3, wherein an etching solution including hydrofluoric acid as the main component is used to conduct the etching process for the main surface of the glass substrate for a magnetic disk.

* * * * *